United States Patent
Wu et al.

(10) Patent No.: US 12,105,327 B2
(45) Date of Patent: Oct. 1, 2024

(54) RESONATOR WITH AT LEAST TWO CORES AND GYROSCOPE APPLICATIONS THEREOF

(71) Applicant: Honeywell International Inc., Charlotte, NC (US)

(72) Inventors: Jianfeng Wu, Tucson, AZ (US); Matthew Wade Puckett, Phoenix, AZ (US); Steven Tin, Edina, MN (US); Tiequn Qiu, Glendale, AZ (US)

(73) Assignee: Honeywell International Inc., Charlotte, NC (US)

( * ) Notice: Subject to any disclaimer, the term of this patent is extended or adjusted under 35 U.S.C. 154(b) by 38 days.

(21) Appl. No.: 18/061,695

(22) Filed: Dec. 5, 2022

(65) Prior Publication Data

US 2024/0184053 A1    Jun. 6, 2024

(51) Int. Cl.
*G02B 6/293* (2006.01)
*G01C 19/24* (2006.01)
*G02B 6/35* (2006.01)

(52) U.S. Cl.
CPC ............ *G02B 6/3596* (2013.01); *G01C 19/24* (2013.01); *G02B 6/29338* (2013.01)

(58) Field of Classification Search
CPC ... G02B 6/29338; G01C 19/72; G01C 19/727
See application file for complete search history.

(56) References Cited

U.S. PATENT DOCUMENTS

| 10,312,658 | B2 * | 6/2019 | Puckett | .................. G02F 1/365 |
| 10,534,136 | B1 | 1/2020 | Puckett et al. | |
| 10,837,779 | B2 * | 11/2020 | Strandjord | ............. G01C 19/72 |
| 11,402,724 | B1 | 8/2022 | Blanco-Redondo et al. | |

FOREIGN PATENT DOCUMENTS

WO    WO-2023276053 A1 *  1/2023

OTHER PUBLICATIONS

European Patent Office, "Extended European Search Report", dated Mar. 11, 2024, from EP Application No. 23198090.5, from Foreign Counterpart to U.S. Appl. No. 18/061,695, pp. 1 through 8, Published: EP.
Hammer et al., "Resonant coupling of dielectric optical waveguides via rectangular microcavities: the coupled guided mode perspective", Optics Communications, vol. 214, No. 1-6, Dec. 15, 2002, pp. 155 through 170.
Rastogi et al., Design and analysis of large-core high-GVD planar optical waveguide for dispersion compensation, Applied Physics B, Lasers and Optics, Vo. 105, No. 4, Jul. 29, 2011, pp. 821 through 824.

* cited by examiner

*Primary Examiner* — Omar R Rojas
(74) *Attorney, Agent, or Firm* — Fogg & Powers LLC (57) ABSTRACT

Techniques are provided for implementing and using a travelling wave resonator, comprising planar optical waveguide including at least two stacked cores, to diminish Kerr effect in the travelling wave resonator. The travelling wave resonator may be used in a resonator optical gyroscope.

16 Claims, 4 Drawing Sheets

RESONATOR WITH AT LEAST TWO CORES AND GYROSCOPE APPLICATIONS THEREOF

STATEMENT REGARDING FEDERALLY SPONSORED RESEARCH OR DEVELOPMENT

This invention was made with Government support under Contract No. 2134830-635857 awarded by the National Science Foundation. The Government has certain rights in the invention.

BACKGROUND

The optical Kerr effect is a source of bias error in optical gyroscopes. The Kerr effect arises when energy intensity is sufficiently high; as a result a refractive index of a material changes with the energy intensity. A cavity resonator, with a high quality, or Q, factor or finesse, is particularly susceptible to the optical Kerr effect due to higher intracavity intensity[1]. As a result, an optical gyroscope using a cavity resonator may suffer from undesirable bias error.

[1] Intracavity intensity means optical power divided by mode area.

SUMMARY

A resonator configured to be mounted over a surface of a substrate, comprising: planar optical waveguide comprising: at least two cores, wherein the at least two cores are stacked in an axis perpendicular to the substrate, wherein at least one of: (a) a surface of one core adjacent to a surface of another core is separated by a first distance of more than twenty percent of a free space wavelength of an optical signal configured to propagate in the planar optical waveguide and (b) centers of each cross section, defined by core width and core thickness, of two adjacent cores are separated by a second distance three or more times the free space wavelength of the optical signal configured to be propagated in the planar optical waveguide; wherein each core has a thickness which is less than or equal to five percent of a free space wavelength of an optical signal configured to propagate in the planar optical waveguide, wherein the thickness means a dimension along an axis perpendicular to the surface, of the substrate, under the resonator, and wherein width means a dimension along another axis substantially perpendicular to the axis of the thickness and parallel with the surface of the substrate; and cladding surrounding each core and over the substrate, wherein an index of refraction of each core is greater than an index of refraction of cladding; wherein the resonator is a travelling wave resonator configured to propagate electromagnetic energy in only one direction.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Reference characters denote like elements throughout figures and text.

DETAILED DESCRIPTION

In the following detailed description, reference is made to the accompanying drawings that form a part hereof, and in which is shown by way of illustration specific illustrative embodiments. However, it is to be understood that other embodiments may be utilized and that structural, mechanical, and electrical changes may be made. Furthermore, the method presented in the drawing figures and the specification is not to be construed as limiting the order in which the individual steps may be performed. The following detailed description is, therefore, not to be taken in a limiting sense.

A travelling wave resonator including planar optical waveguide with two or more cores is provided. A travelling wave resonator means a resonator in which electromagnetic energy propagates in one direction, e.g., clockwise or counterclockwise around the travelling wave resonator. Types of travelling wave resonators include disc, ring, and racetrack resonators. The travelling wave resonator including planar optical waveguide with two or more cores may be used in a resonator optical gyroscope.

By having two or more cores in the planar optical waveguide, the cross-sectional area of a mode of an optical signal propagating in the planar optical waveguide is increased; thus, the optical intensity of the mode of the optical signal is reduced. Each core must be over another core in an axis substantially perpendicular to a substrate upon which the planar optical waveguide is formed. Most of the energy of the optical signal is propagated in cladding (surrounding the two or more cores) of the planar optical waveguide.

The optical Kerr effect is proportional to a product of (a) a non-linear coefficient of material, of the planar optical waveguide, in which the mode of the optical signal propagates and (b) an intensity of a mode, e.g., a TE0 mode, of an optical signal propagating in the material. The non-linear coefficient means a change in an effective index of the mode as a function of electromagnetic power. By increasing an effective cross-sectional area of the mode of the optical signal propagating in a planar optical waveguide, the optical Kerr effect is diminished. The optical Kerr effect is inversely proportional to the effective cross-sectional area of the mode of the optical signal propagating in the planar optical waveguide. Thus, the effective cross-sectional area is increased by having two or more cores in the planar optical waveguide.

Figure 1:
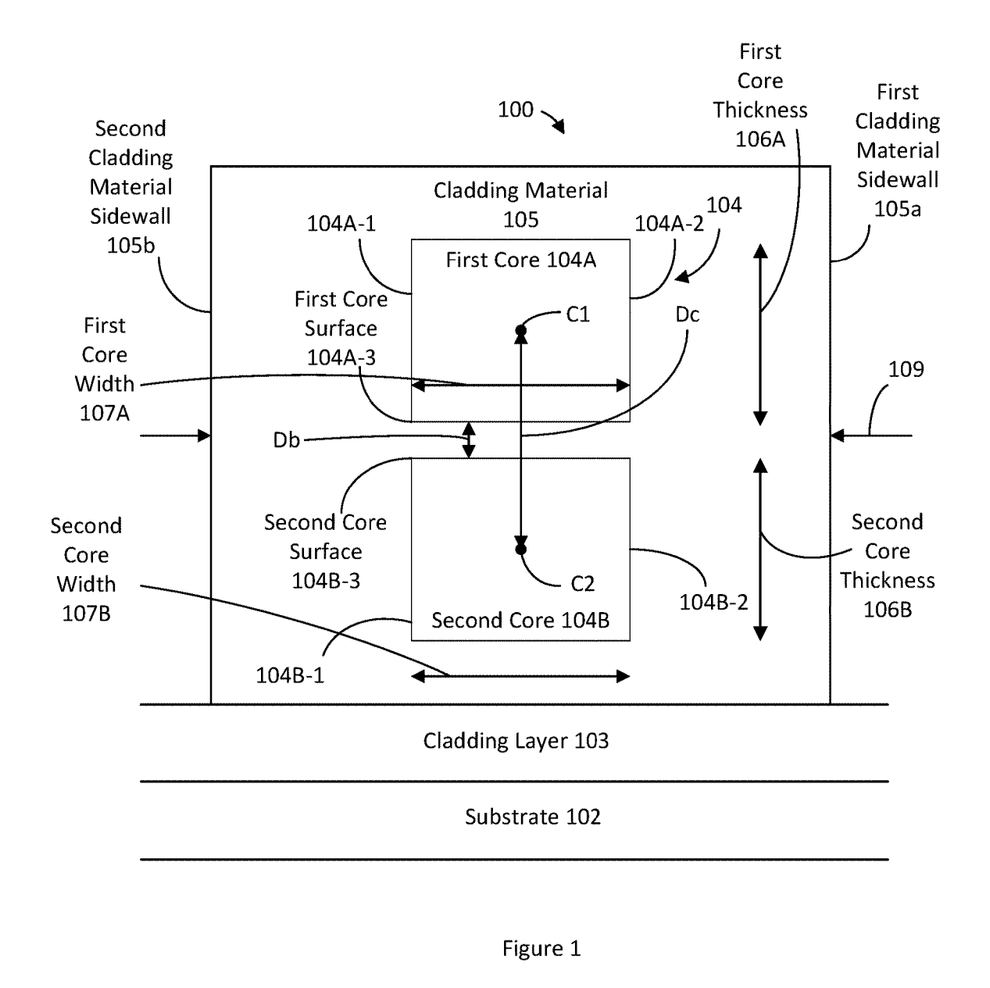
FIG. 1 illustrates a cross section of one embodiment of a planar optical waveguide with two or more cores (PWGTPC)

FIG. 1 illustrates a cross section of one embodiment of a planar optical waveguide with two or more cores (or PWGTPC) 100. The PWGTPC 100 includes two or more cores 104 each of which has a core thickness (or core height) 106A, 106B and a core width 107A, 107B. The at least two cores 104 are stacked over in an axis of the core thickness, i.e., in an axis perpendicular to the substrate. The cladding index of refraction is larger than an index of refraction of each core. For pedagogical purposes, the first core 104A and the second core 104B are illustrated as having the same width and thickness dimensions; however, in other embodiments, one or both of the width and thickness dimensions of two adjacent cores 104A, 104B may vary.

For pedagogical purposes, the PWGTPC 100 is illustrated with a first core 104A and a second core 104B. Each core 104A, 104B has a thickness (or height) which is less than or equal to five percent of the free space wavelength of the optical signal configured to be propagated by such planar optical waveguide. The thickness 106A, 106B of each adjacent core may be substantially equal or not substantially equal. The width 107A, 107B of each core may be substantially equal or not substantially equal. The first core 104A has a center C1 in the center of a cross section of the first core 104A, i.e., midway between each of the first core width 107A and the first core thickness 106A. The second core 104B has a center C2 in the center of a cross section of the second core 104B, i.e., midway between each of the second core width 107B and the second core thickness 106B.

Either one or both of the following is the case: (a) a surface of one core, e.g., first core surface 104A-3, adjacent to a surface of another core, e.g., second core surface 104B-3, is separated by a distance Db of more than twenty percent, e.g., seventy five percent, of a free space wavelength of an optical signal configured to propagate in the planar optical waveguide, and (b) centers C1, C2 of cross sections, defined by a dimension of core width and a dimension of core thickness, of two adjacent cores should be separated by a distance Dc three or more times the free space wavelength configured to be propagated by such planar optical waveguide. Optionally, the first core surface 104A-3 and the second core surface 104B-3 are substantially parallel; further, optionally, each of the first core surface 104A-3 and the second core surface 104B-3 are substantially parallel to a surface of the substrate 102 which supports the PWGTPC 100.

Thickness means a dimension along an axis perpendicular (or orthogonal) to a surfaced of the substrate which supports the PWGTPC 100 (or planar optical waveguide). Width means a dimension along another axis substantially perpendicular to the axis of thickness and parallel with a surface of the substrate which supports the PWGTPC 100 (or the planar optical waveguide).

Each core 104A, 104B has a first core sidewall 104A-1, 104B-1 opposite a second core sidewall 104A-2, 104B-2. A core sidewall 104A-1, 104B-1, 104A-2, 104B-2 means a surface of a first or second core 104A, 104B which is substantially perpendicular to a surface of the substrate 102 which supports the PWGTPC 100 (or the planar optical waveguide).

Optionally, each core 104A, 104B includes silicon nitride; however, other materials can be used to form the core 104A, 104B. The PWGTPC 100 is surrounded by cladding material 105, e.g., deposited over (or around) each core 104A, 104B, and a cladding layer 103, e.g., over which each core 104A, 104B is formed. The cladding material 105 and the cladding layer 103 may be jointly referred to as cladding. Optionally, the cladding material 105 and the cladding layer 103 each comprise silicon dioxide; however, other material(s) can be used to form each of the cladding material 105 and/or the cladding layer 103. The index of refraction of the cladding must be higher than the index of refraction of each of the cores 104A, 104B to permit optical signals to be substantially confined within the PWGTPC 100, e.g., within the cladding; an optical signal propagating in the PWGTPC 100 is configured to be substantially confined within the cladding. The cladding layer 103 is formed on or over a surface of a substrate 102; the surface of the substrate 102 is configured to mechanically support the PWGTPC 100. Optionally, the substrate 102 may be an insulator (for example undoped silicon or glass).

The PWGTPC 100 has a width 109 which is a distance between a first cladding material sidewall 105a and a second cladding sidewall 105b of the PWGTPC 100. Each of the first cladding material sidewall 105a and the second cladding material sidewall 105b is substantially perpendicular to the cladding layer 103 and/or the substrate 102. A cladding material sidewall 105a, 105b means a surface of the cladding material 105 which is substantially perpendicular to the surface of the substrate 102 which mechanically supports the PWGTPC 100.

Embodiments of the invention may be a travelling wave resonator including PWGTPC 100 (or TWPWGTPC). Examples of such a travelling wave resonator are a disc resonator including, e.g., formed with, PWGTPC 100, a ring resonator including the PWGTPC 100, or a racetrack resonator including, e.g., formed with PWGTPC 100. A racetrack resonator includes two halves of a ring resonator joined by two substantially straight portions of PWGTPC 100.

Figure 2A:
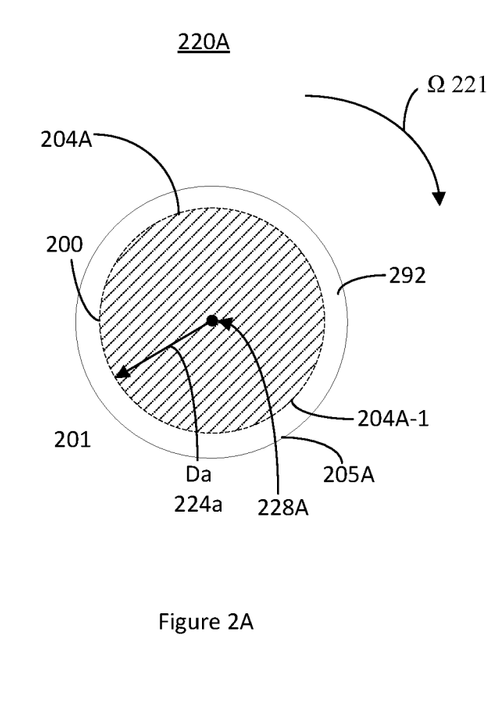
FIG. 2A illustrates a plan view of one embodiment of a disc resonator including PWGTPC.

FIG. 2A illustrates a plan view of one embodiment of a disc resonator including, e.g., formed with, PWGTPC 100 (or DRPWGTPC) 220A. The DRPWGTPC 220A includes PWGTPC 200 formed in a cross-sectional shape of a disc over a substrate 201. The DRPWGTPC 220 includes cladding 292 covering two cores. Because a plan view is used, only one core 204A is shown. The core 204A includes one, an exterior, core surface 204A-1. The DRPWGTPC 220A includes cladding 292 with only one, an exterior, cladding sidewall 205A. The DRPWGTPC 220A also includes a center axis (or rotation axis) 228A around which the DRPWGTPC 220A may be rotated at a rate of rotation ($\Omega$) 221. The DRPPWGTPC 220A has a core diameter Da 224a extending from the center axis 228A to a, e.g., each, core sidewall 204A-1.

Figure 2B:
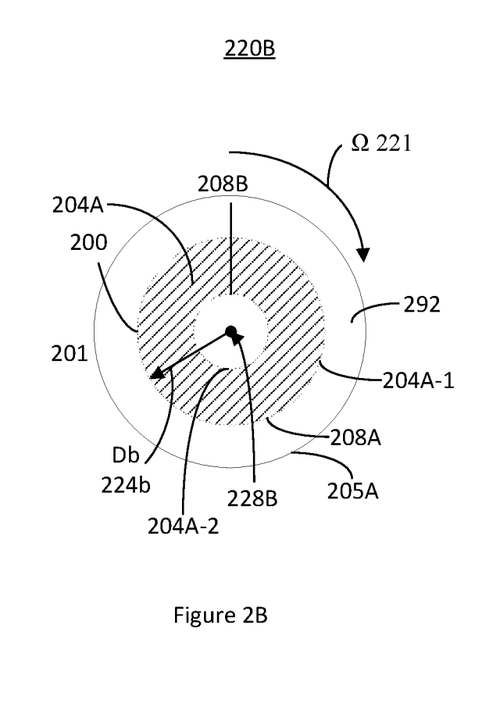
FIG. 2B illustrates a plan view of one embodiment of a ring resonator including PWGTPC.

FIG. 2B illustrates a plan view of one embodiment of a ring resonator including, e.g., formed with, PWGTPC 100 (or RPWGTPC) 220B. The RPWGTPC 220B includes PWGTPC 200 formed in a cross-sectional shape of a ring over a substrate 201. Because a plan view is used, only one core 204A is shown. The core 204A includes an exterior core sidewall 204A-1 and an interior core sidewall 204A-2. The core 204A has an exterior sidewall 204A-1 and an interior sidewall 204A-2. The cladding has an exterior sidewall 205A and an interior sidewall 205B. The sidewalls described with respect to FIGS. 2A and 2B are substantially perpendicular to the surface of the substrate 201 which mechanically supports the corresponding travelling wave resonator. The RPWGTPC 220B also includes a center axis 228B around which the RPWGTPC 220B may be rotated at a rate of rotation ($\Omega$) 221. The core 204A of the RPWGTPC 220B has an outer diameter Db 224b extending from the center axis 228B to the exterior sidewall 204A-1.

A racetrack resonator includes, e.g., formed with, PWGTPC 100. The racetrack resonator including the PWGTPC 100 also includes a center axis around which such racetrack resonator may be rotated at a rate of rotation ($\Omega$). The mode of the optical signal is weakly or strongly confined to the cores of the resonators, e.g., illustrated in FIGS. 2A and 2B.

Figure 3:
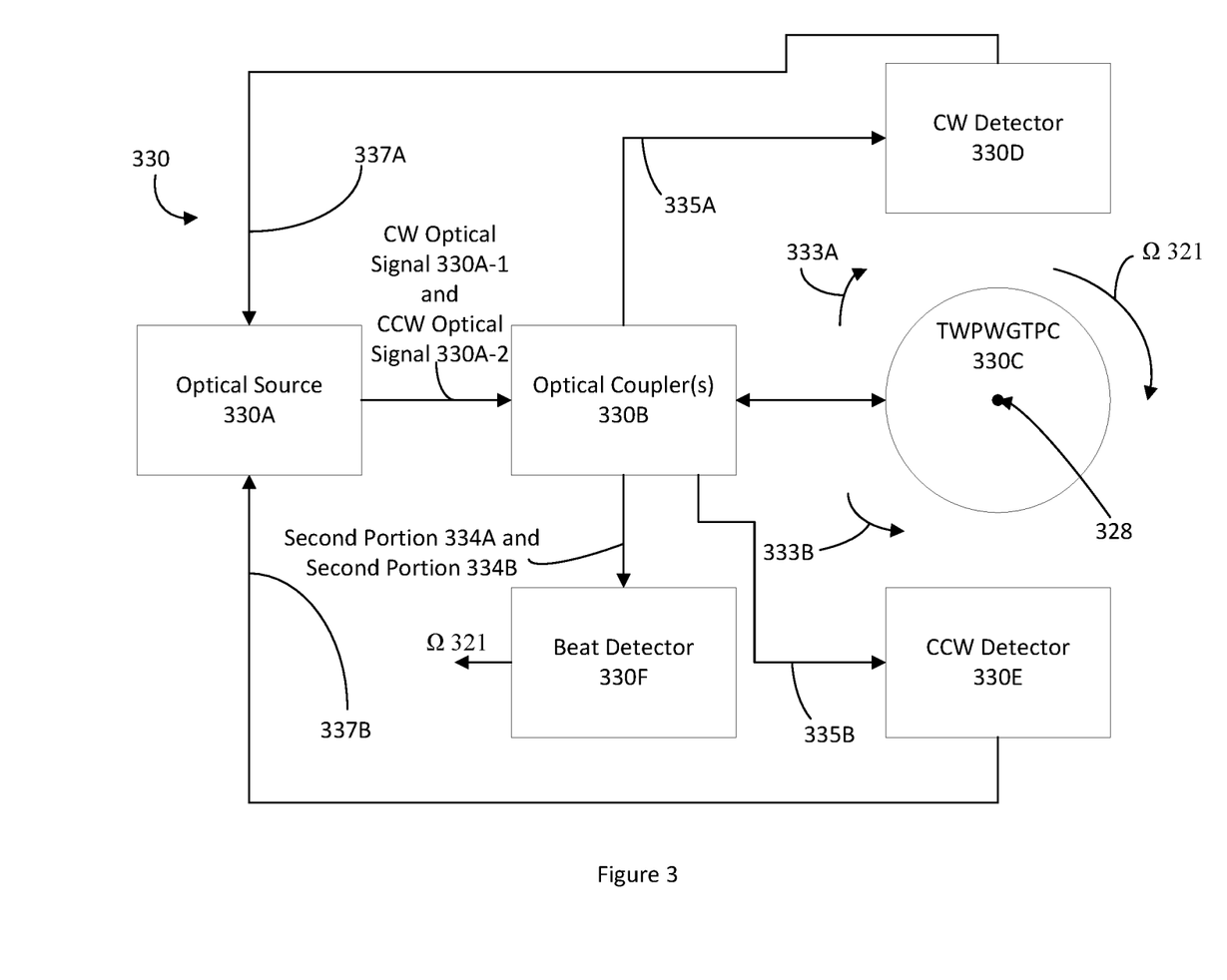
FIG. 3 illustrates a block diagram of one embodiment of a resonator optical gyroscope including a travelling wave resonator including PWGTPC.

FIG. 3 illustrates a block diagram of one embodiment of a resonator optical gyroscope 330 including a TWPWGTPC. The resonator optical gyroscope 330 includes a TWPWGTPC 330C including a center axis (or rotation axis) 328 around which the resonator optical gyroscope 330 may rotate. Optionally, the TWPWGTPC 330C may be implemented using techniques described elsewhere herein, e.g., with respect to FIGS. 1, 2A, and 2B herein.

The resonator optical gyroscope 330 also includes an optical source 330A, at least one optical coupler (optical coupler(s)) 330B, a clockwise optical signal detector (CW detector or CW detector circuit) 330D, a counterclockwise optical signal detector (CCW detector or CCW detector circuit) 330E, and a beat detector (or beat detector circuit) 330F. Optionally, the beat detector may be implemented with optical, analog, and/or digital electronic circuitry. Optionally, the optical source 330A includes one or more lasers. The optical source 330A is configured to generate a clockwise (CW) optical signal 330A-1 and a counterclockwise (CCW) optical signal 330A-2. The optical source 330A is optically coupled to the optical coupler(s) 330B.

The optical coupler(s) 330B are also optically coupled to each of the TWPWGTPC 330C, the CW detector 330D, the CCW detector 330E, and the beat detector 330F. The optical coupler(s) 330B are configured to optically couple the CW optical signal 330A-1, received from the optical source 330A, into the TWPWGTPC 330C so that a portion 333A (of the CW optical signal 330A-1) circulates around the TWPWGTPC 330C in a CW direction. The optical coupler(s) 330B are further configured to optically couple the CCW optical signal 330A-2, received from the optical source 330A, into the TWPWGTPC 330C so that a portion 333B (of the CCW optical signal 330A-2) circulates around the TWPWGTPC 330C in a CCW direction. Optionally, each optical coupler includes, e.g., is formed by, a planar optical waveguide, e.g., configured to support a TE mode, for example TE0 mode, having a portion whose core is adjacent to cores of the TWPWGTPC 330C.

The optical coupler(s) 330B are also configured to optically couple, a first portion 335A of the portion 333A (of the CW optical signal 330A-1) circulating around the TWPWGTPC 330C in the CW direction, to the CW detector 330D. Optionally, each of the CW detector 330D and the CCW detector 330E may be a detector, e.g., a photodiode, configured to determine incident optical power level. Each of the CW detector 330D and the CCW detector 330E is coupled to the optical source 330A. The CW detector 330D provides a CW control signal 337A to the optical source 330A indicative of a power level of the first portion 335A. The optical coupler(s) 330B are also configured to optically couple, a first portion 335A of the portion 333A (of the CW optical signal 330A-1) circulating around the TWPWGTPC 330C in the CW direction, to the CW detector 330D. The optical coupler(s) 330B are also configured to optically couple, a first portion 335B of the portion 333B (of the CCW optical signal 330A-2) circulating around the TWPWGTPC 330C in the CCW direction, to the CCW detector 330E. The CCW detector 330E provides a CCW control signal 337B to the optical source 330A indicative of a power level of the first portion 335A. When the resonator optical gyroscope 330 is rotated around its center axis 328, the resonant frequencies in each of the CW and CCW directions are separated (or become different) due to the Sagnac effect. The optical source 330A is configured to use the CW control signal 337A to adjust a carrier frequency of the CW optical signal 330A-1 to be equal to the resonant frequency of TWPWGTPC 330C in the CW direction including accounting for changes in the resonant frequency due to a rotation rate 321 around the center axis 328. The optical source 330A is configured to use the CCW control signal 337B to adjust a carrier frequency of the CCW optical signal 330A-2 to be equal to the resonant frequency of TWPWGTPC 330C in the CCW direction including accounting for changes in the resonant frequency due to the rotation rate 321 around the center axis 328.

The optical coupler(s) 330B are also configured to optically couple, to the beat detector 330F, a second portion 334A of the portion 333A (of the CW optical signal 330A-1) circulating CW around the TWPWGTPC 330C and a second portion 334B of the portion 333B (of the CCW optical signals 333A-2) circulating CCW around the TWPWGTPC 330C. The beat detector 330F is configured to determine a rate of rotation 321 around the center axis 328 of the TWPWGTPC 330C. The rate of rotation 321 is a function of a difference (or beat), Δf, of a carrier frequency of the second portion 334A of the portion 333A (of the CW optical signal 330A-1) circulating CW around the TWPWGTPC 330C and a carrier frequency of the second portion 334B of the portion 333B (of the CCW optical signal 330A-2) circulating CCW around the TWPWGTPC 330C. Optionally, the rate of rotation 321 may also be a function of dimensions of the TWPWGTPC 330C, e.g., a diameter, e.g., the core diameter D 224a, 224b, of the TWPWGTPC, an average wavelength, λ, of the CW optical signal 330A-1 and the CCW optical signal 330A-2, and a refractive index, n, of the TWPWGTPC 330C, e.g., of the cladding in the TWPWGTPC 330C. For each of the DRPWGTPC 220A and the RPWGTPC 220B, the rate of rotation 321 around the rotation axis 328 of the TWPWGTPC 330C is:

$$\Omega = (\Delta f * n * \lambda)/D$$

Equations for other travelling wave resonators, e.g., a racetrack resonator, may differ.

Figure 4:
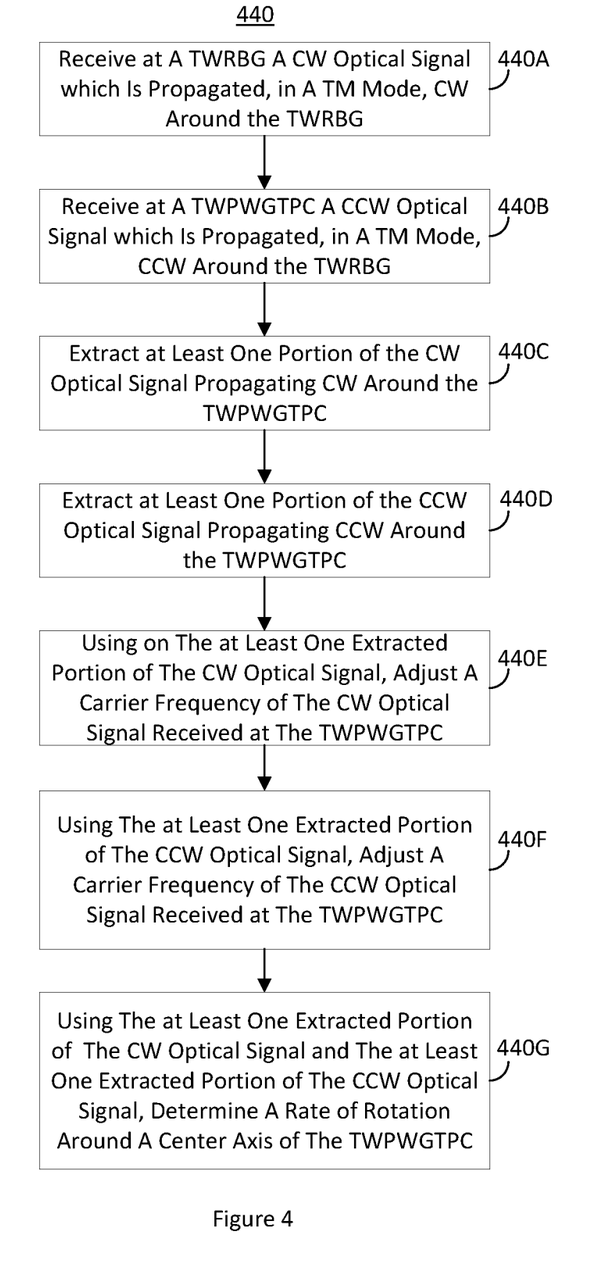
FIG. 4 illustrates one embodiment of a method of operation of a resonator optical gyroscope including a travelling wave resonator including PWGTPC.

FIG. 4 illustrates a flow diagram of one embodiment of a method 440 of operation of a resonator optical gyroscope including a TWPWGTPC. To the extent that the methods shown in any Figures are described herein as being implemented with any of the systems illustrated herein, it is to be understood that other embodiments can be implemented in other ways. Optionally, method 440 may be implemented by TWPWGTPC described with respect to FIGS. 1-2B. Optionally, method 440 may be implemented by a TWRBG and a gyroscope described elsewhere herein, e.g., with respect to one or more of FIGS. 1, 2A, 2B, and 3. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 440A, a CW optical signal is received at a TWPWGTPC and propagated, e.g., in a TE mode (for example a TE0 mode), clockwise around the TWPWGTPC. Optionally, the TWPWGTPC may be implemented as described elsewhere herein. In block 440B, a CCW optical signal is received at a TWPWGTPC and propagated, for example a TE mode (for example a TE0 mode), counterclockwise around the TWPWGTPC.

In block 440C, at least one portion of the CW optical signal propagating clockwise around the TWPWGTPC is extracted from the TWPWGTPC. Optionally, the at least portion of the CW optical signal propagating clockwise around the TWPWGTPC includes a first extracted portion and a second extracted portion of the CW optical signal propagating around the TWPWGTPC.

In block 440D, at least one portion of the CCW optical signal propagating counterclockwise around the TWPWGTPC is extracted from the TWPWGTPC.

Optionally, the at least portion of the CCW optical signal propagating clockwise around the TWPWGTPC includes a first extracted portion and a second extracted portion of the CCW optical signal propagating around the TWPWGTPC.

In block 440E, using the at least one extracted portion of the CW optical signal, a carrier frequency of the CW optical signal, received at the TWPWGTPC, is adjusted to equal a CW resonant frequency of the TWPWGTPC. Optionally, the first extracted portion of the CW optical signal propagating clockwise around the TWPWGTPC is used to adjust the carrier frequency of the CW optical signal, received at the TWPWGTPC, to equal the CW resonant frequency of the TWPWGTPC.

In block 440F, using the at least one extracted portion of the CCW optical signal, a carrier frequency of the CCW optical signal, received at the TWPWGTPC, is adjusted to equal a CCW resonant frequency of the TWPWGTPC. Optionally, the first extracted portion of the CCW optical signal propagating clockwise around the TWPWGTPC is used to adjust the carrier frequency of the CCW optical signal, received at the TWPWGTPC, to equal the CCW resonant frequency of the TWPWGTPC.

In block 440G, using a carrier frequency of the at least one extracted portion of the CW optical signal and a carrier frequency of the at least one extracted portion of the CCW optical signal, a rate of rotation around a center axis of the TWPWGTPC is determined. Optionally, the rate of rotation around the TWPWGTPC may be implemented as described elsewhere herein. Optionally, the carrier frequency of the second extracted portion of the CW optical signal and the carrier frequency of the second extracted portion of the CCW optical signal are used to determine the rate of rotation of the resonator optical gyroscope around a center axis of the TWPWGTPC.

Terms of relative position as used in this application are defined based on a plane parallel to, or in the case of the term coplanar—the same plane as, the conventional plane or working surface of a layer, wafer, or substrate, regardless of orientation. The term "horizontal" or "lateral" as used in this application are defined as a plane parallel to the conventional plane or working surface of a layer, wafer, or substrate, regardless of orientation. The term "vertical" refers to a direction perpendicular to the horizontal. Terms such as "on," "side" (as in "sidewall"), "higher," "lower," "over," "top," and "under" are defined with respect to the conventional plane or working surface being on the top surface of a layer, wafer, or substrate, regardless of orientation. The term "coplanar" as used in this application is defined as a plane in the same plane as the conventional plane or working surface of a layer, wafer, or substrate, regardless of orientation.

EXEMPLARY EMBODIMENTS

Example 1 includes a resonator configured to be mounted over a surface of a substrate, comprising: planar optical waveguide comprising: at least two cores, wherein the at least two cores are stacked in an axis perpendicular to the substrate, wherein at least one of: (a) a surface of one core adjacent to a surface of another core is separated by a first distance of more than twenty percent of a free space wavelength of an optical signal configured to propagate in the planar optical waveguide and (b) centers of each cross section, defined by core width and core thickness, of two adjacent cores are separated by a second distance three or more times the free space wavelength of the optical signal configured to be propagated in the planar optical waveguide; wherein each core has a thickness which is less than or equal to five percent of a free space wavelength of an optical signal configured to propagate in the planar optical waveguide, wherein the thickness means a dimension along an axis perpendicular to the surface, of the substrate, under the resonator, and wherein width means a dimension along another axis substantially perpendicular to the axis of the thickness and parallel with the surface of the substrate; and cladding surrounding each core and over the substrate, wherein an index of refraction of each core is greater than an index of refraction of cladding; wherein the resonator is a travelling wave resonator configured to propagate electromagnetic energy in only one direction.

Example 2 includes the resonator of Example 1, wherein the surface of the one core adjacent to the surface of another core is separated by the first distance of more than seventy five percent of the free space wavelength of the optical signal configure dot propagate in the planar optical waveguide.

Example 3 includes the resonator of any of Examples 1-2, wherein the core comprises silicon nitride.

Example 4 includes the resonator of any of Examples 1-3, wherein the cladding comprises silicon dioxide.

Example 5 includes the resonator of any of Examples 1-4, wherein travelling wave resonator is one of a ring resonator, a disc resonator, and a racetrack resonator.

Example 6 includes the resonator of any of Examples 1-5, further comprising the substrate.

Example 7 includes a resonator optical gyroscope, comprising: a travelling wave resonator configured to be mounted over a surface of a substrate, wherein the travelling wave resonator is a resonator in which electromagnetic energy propagates in only one direction; the travelling wave resonator comprising: planar optical waveguide comprising: at least two cores, wherein the at least two cores are stacked in an axis perpendicular to the surface of the substrate, wherein at least one of: (a) a surface of one core adjacent to a surface of another core is separated by a first distance of more than twenty percent of a free space wavelength of an optical signal configured to propagate in the planar optical waveguide and (b) centers of cross sections, defined by core width and core thickness, of two adjacent cores are separated by a second distance three or more times the free space wavelength of the optical signal configured to be propagated in the planar optical waveguide; wherein each core has a thickness which is less than or equal to five percent of a free space wavelength of an optical signal configured to propagate in the planar optical waveguide, wherein the thickness means a dimension along an axis perpendicular to the surface of the substrate, and wherein width means a dimension along another axis substantially perpendicular to the axis of the thickness and parallel with a surface of the substrate; and cladding surrounding each core and over the substrate, wherein an index of refraction of each core is greater than an index of refraction of cladding; and a rotation axis around which the travelling wave resonator is configured to be rotated; an optical source, comprising at least one laser, configured to emit a clockwise (CW) optical signal and a counterclockwise (CCW) optical signal; at least one optical coupler configured to (a) optically couple, to the travelling wave resonator, (i) a portion of the CW optical signal configured to propagate CW around the travelling wave resonator and (ii) a portion of the CCW optical signal configured to propagate CW around the travelling wave resonator, (b) optically couple, (p) to a CW detector circuit, a first portion of the portion of the CW optical signal and (q) to a CCW detector circuit, a first portion of the portion of the CCW optical signal, and (c) optically couple, to a beat detector circuit, a second portion of the portion of the CW optical signal and a second portion of the portion of the CCW optical signal; the CW detector circuit configured to provide a CW control signal to the optical source; the CCW detector circuit configured to provide a CCW control signal to the optical source; wherein the optical source is further configured to use the CW control signal to adjust a carrier frequency of the CW optical signal to equal to a resonant frequency of the travelling wave resonator in a CW direction and use the CCW control signal to adjust a carrier frequency of the CCW optical signal to equal a resonant frequency of the travelling wave resonator in a CCW direction; and the beat detector circuit configured to determine a rate of rotation around the rotation axis based upon a difference of a carrier frequency of the second portion of the CW optical signal and the second portion of the CCW optical signal.

Example 8 includes the resonator optical gyroscope of Example 7, wherein the surface of the one core adjacent to the surface of another core is separated by the first distance of more than seventy five percent of the free space wavelength of the optical signal configure dot propagate in the planar optical waveguide.

Example 9 includes the resonator optical gyroscope of any of Examples 7-8, wherein the core comprises silicon nitride.

Example 10 includes the resonator optical gyroscope of any of Examples 7-9, wherein the cladding comprises silicon dioxide.

Example 11 includes the resonator optical gyroscope of any of Examples 7-10, wherein travelling wave resonator is one of a ring resonator, a disc resonator, and a racetrack resonator.

Example 12 includes the resonator optical gyroscope of any of Examples 7-11, wherein the rate of rotation is: $\Omega=(\Delta f * n * \lambda)/D$, where D is a diameter of the travelling wave resonator, $\lambda$ is an average wavelength of the CW optical signal and the CCW optical signal, and n is a refractive index of the cladding; wherein the travelling wave resonator is one of a disc resonator and a ring resonator.

Example 13 includes the resonator optical gyroscope of any of Examples 7-12, further comprising the substrate.

Example 14 includes a method of operation of a resonant optical gyroscope comprising travelling wave resonator configured to be mounted over a surface of a substrate, the method comprising: receiving, a clockwise (CW) optical signal at the travelling wave resonator and propagating the CW optical signal in a transverse magnetic mode clockwise around the travelling wave resonator, wherein the travelling wave resonator is a resonator in which electromagnetic energy propagates in only one direction, and wherein the travelling wave resonator comprises: planar optical waveguide comprising: at least two cores, wherein the at least two cores are stacked in an axis perpendicular to the surface of the substrate, wherein at least one of: (a) a surface of one core adjacent to a surface of another core is separated by a first distance of more than twenty percent of a free space wavelength of an optical signal configured to propagate in the planar optical waveguide and (b) centers of cross sections, defined by core width and core thickness, of two adjacent cores are separated by a second distance three or more times the free space wavelength of the optical signal configured to be propagated in the planar optical waveguide; wherein each core has a thickness which is less than or equal to five percent of a free space wavelength of an optical signal configured to propagate in the planar optical waveguide, wherein the thickness means a dimension along an axis perpendicular to the surface of the substrate, and wherein width means a dimension along another axis substantially perpendicular to the axis of the thickness and parallel with the surface of the substrate; and cladding surrounding each core and over the substrate, wherein an index of refraction of each core is greater than an index of refraction of cladding; and a rotation axis around which the travelling wave resonator is configured to be rotated; receiving, a counterclockwise (CCW) optical signal at the travelling wave resonator and propagating the CCW optical signal in a transverse magnetic mode counterclockwise around the travelling wave resonator; extracting, from the travelling wave resonator, at least one portion of the CW optical signal propagating clockwise around the travelling wave resonator; extracting, from the travelling wave resonator, at least one portion of the CCW optical signal propagating clockwise around the travelling wave resonator; using the at least one portion of the CW optical signal, adjusting a carrier frequency of the CW optical signal, received at the travelling wave resonator, to equal a CW resonant frequency of the travelling wave resonator; using the at least one portion of the CCW optical signal, adjusting a carrier frequency of the CCW optical signal, received at the travelling wave resonator, to equal a CCW resonant frequency of the travelling wave resonator; and using the carrier frequency of the at least one portion of the CW optical signal and a carrier frequency of the at least one portion of the CCW optical signal, determining a rate of rotation around the rotation axis of the travelling wave resonator.

Example 15 includes the method of Example 14, wherein the surface of the one core adjacent to the surface of another core is separated by the first distance of more than seventy five percent of the free space wavelength of the optical signal configure dot propagate in the planar optical waveguide.

Example 16 includes the method of any of Examples 14-15, wherein the core comprises silicon nitride.

Example 17 includes the method of any of Examples 14-16, wherein the cladding comprises silicon dioxide.

Example 18 includes the method of any of Examples 14-17, wherein travelling wave resonator is one of a ring resonator, a disc resonator, and a racetrack resonator.

Example 19 includes the method of any of Examples 14-18, wherein the rate of rotation is: $\Omega=(\Delta f * n * \lambda)/D$, where D is a diameter of the travelling wave resonator, $\lambda$ is an average wavelength of the CW optical signal and the CCW optical signal, and n is a refractive index of the cladding; wherein the travelling wave resonator is one of a disc resonator and a ring resonator.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A resonator configured to be mounted over a surface of a substrate, comprising:
   planar optical waveguide comprising:
      at least two cores, wherein the at least two cores are stacked in an axis perpendicular to the substrate, wherein at least one of: (a) a surface of one core adjacent to a surface of another core is separated by a first distance of more than seventy five percent of a free space wavelength of an optical signal configured to propagate in the planar optical waveguide and (b) centers of each cross section, defined by core width and core thickness, of two adjacent cores are separated by a second distance three or more times the free space wavelength of the optical signal configured to be propagated in the planar optical waveguide;

wherein each core has a thickness which is less than or equal to five percent of the free space wavelength of the optical signal configured to propagate in the planar optical waveguide, wherein the thickness means a dimension along the axis perpendicular to the surface, of the substrate, under the resonator, and wherein width means a dimension along another axis substantially perpendicular to the axis of the thickness and parallel with the surface of the substrate; and cladding surrounding each core and over the substrate, wherein an index of refraction of each core is greater than an index of refraction of the cladding wherein the resonator is a travelling wave resonator configured to propagate electromagnetic energy in only one direction.

2. The resonator of claim 1, wherein each core comprises silicon nitride.

3. The resonator of claim 1, wherein the cladding comprises silicon dioxide.

4. The resonator of claim 1, further comprising the substrate.

5. A resonator optical gyroscope, comprising:

a travelling wave resonator configured to be mounted over a surface of a substrate, wherein the travelling wave resonator is a resonator in which electromagnetic energy propagates in only one direction;

the travelling wave resonator comprising:

planar optical waveguide comprising:

at least two cores, wherein the at least two cores are stacked in an axis perpendicular to the surface of the substrate, wherein at least one of: (a) a surface of one core adjacent to a surface of another core is separated by a first distance of more than seventy five percent of a free space wavelength of an optical signal configured to propagate in the planar optical waveguide and (b) centers of cross sections, defined by core width and core thickness, of two adjacent cores are separated by a second distance three or more times the free space wavelength of the optical signal configured to be propagated in the planar optical waveguide;

wherein each core has a thickness which is less than or equal to five percent of the free space wavelength of the optical signal configured to propagate in the planar optical waveguide, wherein the thickness means a dimension along the axis perpendicular to the surface of the substrate, and wherein width means a dimension along another axis substantially perpendicular to the axis of the thickness and parallel with a surface of the substrate; and cladding surrounding each core and over the substrate, wherein an index of refraction of each core is greater than an index of refraction of the cladding; and a rotation axis around which the travelling wave resonator is configured to be rotated;

an optical source, comprising at least one laser, configured to emit a clockwise (CW) optical signal and a counterclockwise (CCW) optical signal;

at least one optical coupler configured to (a) optically couple, to the travelling wave resonator, (i) a portion of the CW optical signal configured to propagate CW around the travelling wave resonator and (ii) a portion of the CCW optical signal configured to propagate CCW around the travelling wave resonator, (b) optically couple, (p) to a CW detector circuit, a first portion of the portion of the CW optical signal and (q) to a CCW detector circuit, a first portion of the portion of the CCW optical signal, and (c) optically couple, to a beat detector circuit, a second portion of the portion of the CW optical signal and a second portion of the portion of the CCW optical signal;

the CW detector circuit configured to provide a CW control signal to the optical source;

the CCW detector circuit configured to provide a CCW control signal to the optical source;

wherein the optical source is further configured to use the CW control signal to adjust a carrier frequency of the CW optical signal to equal to a resonant frequency of the travelling wave resonator in a CW direction and use the CCW control signal to adjust a carrier frequency of the CCW optical signal to equal a resonant frequency of the travelling wave resonator in a CCW direction; and the beat detector circuit configured to determine a rate of rotation around the rotation axis based upon a difference of a carrier frequency of the second portion of the CW optical signal and the second portion of the CCW optical signal.

6. The resonator optical gyroscope of claim 5, wherein each core comprises silicon nitride.

7. The resonator optical gyroscope of claim 5, wherein the cladding comprises silicon dioxide.

8. The resonator optical gyroscope of claim 5, wherein travelling wave resonator is one of a ring resonator, a disc resonator, and a racetrack resonator.

9. The resonator optical gyroscope of claim 5, wherein the rate of rotation is:

$$\Omega = (\Delta f * n * \lambda)/D,$$

where D is a diameter of the travelling wave resonator, $\lambda$ is an average wavelength of the CW optical signal and the CCW optical signal, and n is a refractive index of the cladding;

wherein the travelling wave resonator is one of a disc resonator and a ring resonator.

10. The resonator optical gyroscope of claim 5, further comprising the substrate.

11. A method of operation of a resonant optical gyroscope comprising a travelling wave resonator configured to be mounted over a surface of a substrate, the method comprising:

receiving, a clockwise (CW) optical signal at the travelling wave resonator and propagating the CW optical signal in a transverse magnetic mode clockwise around the travelling wave resonator, wherein the travelling wave resonator is a resonator in which electromagnetic energy propagates in only one direction, and wherein the travelling wave resonator comprises:

planar optical waveguide comprising:

at least two cores, wherein the at least two cores are stacked in an axis perpendicular to the surface of the substrate, wherein at least one of: (a) a surface of one core adjacent to a surface of another core is separated by a first distance of more than seventy five percent of a free space wavelength of an optical signal configured to propagate in the planar optical waveguide and (b) centers of cross sections, defined by core width and core thickness, of two adjacent cores are separated by a second distance three or more times the free space wavelength of the optical signal configured to be propagated in the planar optical waveguide;

wherein each core has a thickness which is less than or equal to five percent of the free space wavelength of the optical signal configured to propagate in the planar optical waveguide, wherein the thickness means a dimension along the axis perpendicular to the surface of the substrate, and wherein width means a dimension along another axis substantially perpendicular to the axis of the thickness and parallel with the surface of the substrate; and cladding surrounding each core and over the substrate, wherein an index of refraction of each core is greater than an index of refraction of cladding; and a rotation axis around which the travelling wave resonator is configured to be rotated;

receiving, a counterclockwise (CCW) optical signal at the travelling wave resonator and propagating the CCW optical signal in a transverse magnetic mode counterclockwise around the travelling wave resonator;

extracting, from the travelling wave resonator, at least one portion of the CW optical signal propagating clockwise around the travelling wave resonator;

extracting, from the travelling wave resonator, at least one portion of the CCW optical signal propagating counterclockwise around the travelling wave resonator;

using the at least one portion of the CW optical signal, adjusting a carrier frequency of the CW optical signal, received at the travelling wave resonator, to equal a CW resonant frequency of the travelling wave resonator;

using the at least one portion of the CCW optical signal, adjusting a carrier frequency of the CCW optical signal, received at the travelling wave resonator, to equal a CCW resonant frequency of the travelling wave resonator; and using the carrier frequency of the at least one portion of the CW optical signal and a carrier frequency of the at least one portion of the CCW optical signal, determining a rate of rotation around the rotation axis of the travelling wave resonator.

12. The method of claim 11, wherein each core comprises silicon nitride.

13. The method of claim 11, wherein the cladding comprises silicon dioxide.

14. The method of claim 11, wherein the travelling wave resonator is one of a ring resonator, a disc resonator, and a racetrack resonator.

15. The method of claim 11, wherein the rate of rotation is:

$$\Omega = (\Delta f * n * \lambda)/D,$$

where D is a diameter of the travelling wave resonator, $\lambda$ is an average wavelength of the CW optical signal and the CCW optical signal, and n is a refractive index of the cladding;

wherein the travelling wave resonator is one of a disc resonator and a ring resonator.

16. The resonator of claim 1, wherein the resonator is one of a ring resonator, a disc resonator, and a racetrack resonator.

* * * * *